Aug. 18, 1953     W. J. ALBERSHEIM     2,649,578

WAVE GUIDE ELBOW

Filed Dec. 2, 1949     4 Sheets-Sheet 1

INVENTOR
W. J. ALBERSHEIM
BY
ATTORNEY

INVENTOR
W. J. ALBERSHEIM
BY
ATTORNEY

Aug. 18, 1953  W. J. ALBERSHEIM  2,649,578
WAVE GUIDE ELBOW
Filed Dec. 2, 1949  4 Sheets-Sheet 3

INVENTOR
W. J. ALBERSHEIM
BY
ATTORNEY

Aug. 18, 1953 W. J. ALBERSHEIM 2,649,578
WAVE GUIDE ELBOW
Filed Dec. 2, 1949 4 Sheets-Sheet 4

INVENTOR
W. J. ALBERSHEIM
BY N. D. Ewing
ATTORNEY

Patented Aug. 18, 1953

2,649,578

UNITED STATES PATENT OFFICE 2,649,578

WAVE-GUIDE ELBOW

Walter J. Albersheim, Interlaken, N. J., assignor to Bell Telephone Laboratories, Incorporated, New York, N. Y., a corporation of New York Application December 2, 1949, Serial No. 130,670

13 Claims. (Cl. 333—98)

This invention relates to the guided transmission of ultra-high frequency electromagnetic waves and more particularly to the propagation of waves of the circular electric or $TE_{01}$ mode through curved bends and elbows in circular wave-guide structures. As used throughout the specification, the term bend will be taken to refer to gradually curved sections of wave guide having large bending radii while the term elbow will be used to refer to relatively sharp curved sections of wave guide having short bending radii.

The propagation of microwave energy in the form of $TE_{01}$ waves in circular wave guides is ideally suited for the long distance transmission of wide band signals since the attenuation characteristic of this transmission mode, unlike that of all other modes, decreases with increasing frequency. However, one difficulty with this method of transmission is that the $TE_{01}$ mode is not the dominant mode supported in a circular wave guide, and consequently energy may be lost to other modes also capable of transmission therein. In an ideal wave guide which is perfectly straight, uniform and conducting, the propagation of $TE_{01}$ waves therethrough is undisturbed, but slight imperfections in the guide and especially curvature of the wave-guide axis may excite waves of other modes and produce serious losses. These losses are attributed mainly to the fact that the bending of the guide produces a coupling between the desired TE and other transmission modes, mainly the $TM_{11}$ mode.

In his article entitled "Propagation of $TE_{01}$ waves in curved wave guides" appearing in the January 1949 issue of the Bell System Technical Journal, vol. 28, No. 1 the present inventor reports on the nature of this mode coupling and likens it to that between traveling alternating-current waves in coupled transmission lines. Each mode capable of transmission in the wave guide is analogous to a separate transmission line. Since the predominant losses in the bends considered herein are due to interaction between the $TE_{01}$ and $TM_{11}$ modes, it will be sufficient to consider only two coupled lines; a "primary" line representing the desired or $TE_{01}$ mode and a "secondary" line representing the undesired or $TM_{11}$ mode.

In two such lines there exist for each frequency and direction of travel two distinct traveling-wave configurations, from superposition of which all possible current distributions may be built up. In the limiting case when the lines are uncoupled, these configurations consist of a wave in the primary line alone and a wave in the secondary line alone. When the lines are coupled it is not possible to impress a current on one line alone without generating a secondary current in the other line. The two possible wave configurations in the second case are (a) one in which the electromagnetic fields generated by the currents in the two lines tend to be in phase and reinforce each other, and (b) one in which the fields tend to be in opposite phases and weaken each other. Due to the greater energy storage, configuration (a) has a slower phase velocity than configuration (b), so that if both configurations coexist, there will be beats between them as they travel along the two lines. Due to the different phase relations between primary and secondary currents in the two configurations, these beats alternately increase and decrease the current in each line in a sinusoidal manner. If at the point of origin, current is made to flow in the primary line only, configurations (a) and (b) will coexist in such amplitude and phase relations that their components cancel each other out in the secondary line at that point; at other points along the lines energy will be transferred in increasing or decreasing amounts into the secondary line so that a sinusoidal current flow in that line will be observed.

The amount of energy transfer between lines per unit length has been shown in the above Bell System Technical Journal paper to depend upon the coupling discriminant $\kappa$ which is defined as the coupling coefficient $k$ divided by the relative difference in propagation constants, and may be expressed as follows:

$$\kappa = \frac{k}{\Gamma_1 - \Gamma_2}\sqrt{\Gamma_1\Gamma_2} \qquad (1)$$

The coupling coefficient $k$ may be expressed broadly in terms of the energy stored in the individual lines 1 and 2 and the energy transferred from one line to the other. The paper shows that if the coupling discriminant is much smaller than one, only a small fraction of the energy originally flowing in the primary line will be transferred to the secondary line before the energy flow is reversed; if the coupling discriminant is much larger than unity, nearly the entire energy flows back and forth between primary and secondary lines.

For the purpose of further exposition of the present invention the term effective interaction length is introduced. This term may be defined mathematically as the integral of the coupling discriminant $\kappa$ over the entire length of the coupled line section and will therefore represent the total energy transfer between lines. It should be noted that the coupling coefficient $k$ may vary from positive to negative values (for instance by reversing the polarity of a coupling inductance) and it is therefore possible to make the effective interaction length zero even though the coupling coefficient is finite over nearly the entire coupling length.

Applying the above transmission-line analogy to the coupling between the desired $TE_{01}$ mode and the $TM_{11}$ mode (or in exceptional cases, other undesired transmission modes) in a wave guide containing intentional or unintentional bends, it has been shown in the Bell System Technical Journal paper that the coupling coefficient $k$ is proportional to the curvature of the bend and to the diameter of the wave guide. The relative difference in propagation constants $$\left(\frac{\Gamma_1 - \Gamma_2}{\sqrt{\Gamma_1 \Gamma_2}}\right)$$

between the $TE_{01}$ and $TM_{11}$ modes is very small in a smooth, highly conductive wave guide, and approaches zero in a wave guide of zero resistivity.

From this, it follows that in an ordinary smooth wave-guide bend the coupling discriminant $\kappa$ as expressed in Equation 1 supra, tends to be large so that nearly the entire energy of the $TE_{01}$ mode impressed upon the beginning of the bend may be transferred to the $TM_{11}$ mode by interference between the two configurations consisting of combinations of "primary" and "secondary" currents, that is, of $TE_{01}$ and $TM_{11}$ components.

Accordingly, it is a general object of the present invention to provide $TE_{01}$ circular wave-guide bend and elbow designs wherein losses due to curvature of the guide are substantially reduced or eliminated.

Another object of the invention is to provide broad-band, low-loss bend and elbow designs for $TE_{01}$ circular wave guides.

A specific object is to provide $TE_{01}$ circular wave-guide bends and elbows wherein degeneration of $TE_{01}$ wave into $TM_{11}$ wave power is substantially eliminated.

In furtherance of the objectives of the present invention means are provided for minimizing or canceling the effective interaction length of bends or elbows in $TE_{01}$ wave guides. In one group of designs this is accomplished by increasing the relative difference in propagation constants, and in another by reversing the polarity of the coupling coefficient $k$ part way through the bend.

The nature of the present invention and other objects, features and advantages thereof will be apparent from a consideration of the following detailed description and drawings in which.

Figure 1:
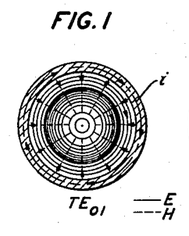
Figs. 1 and 2 illustrate the transverse electromagnetic field patterns of the $TE_{01}$ and $TM_{11}$ waves, respectively.
Figure 2:
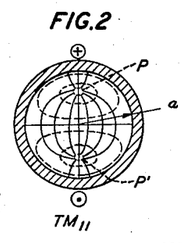

Referring to the figures, Figs. 1 and 2 illustrate the distribution of the electric and magnetic fields in transverse sections of a pair of circular wave guides supporting the $TE_{01}$ and $TM_{11}$ transmission modes, respectively. The transverse electric $TE_{01}$ wave illustrated in Fig. 1 is designated as the circular electric type inasmuch as the electric field shown by the solid lines, consists of circular lines coaxial with the guide and lying transversely thereto without any longitudinal components. The transverse component of the magnetic field, indicated by the dotted lines, forms at various points along the guide a radial pattern, the intensity of which attains a maximum approximately half way between the axis and the surface of the guide and drops to zero at the surface. The current flow associated with the $TE_{01}$ wave is predominantly circular around the periphery of the guide as illustrated in Fig. 1.

The configuration of the transverse magnetic $TM_{11}$ mode shown in Fig. 2 is similar to that of a shielded conductor pair. The magnetic field pattern is entirely transversal without any longitudinal components and is indicated by the dotted lines encircling the respective poles $p$, $p'$ which, in the case of a plane bend, exhibit an orientation in a plane normal to the plane of the bend. Since the magnetic lines must form closed paths, they tend to spread out near the center of the guide and to crowd close together at the inner surface mostly near the vertical axis of the guide thus inducing a considerable longitudinal conduction current flow in the wall of the guide as shown conventionally in Fig. 2.

In a microwave system for the transmission of $TE_{01}$ waves the inside radius $a$ of the circular pipe guide selected for the propagation of these waves must be greater than the critical or cut-off radius $a_c$ for the $TE_{01}$ mode. The cut-off radius $a_c$ for the $TE_{01}$ mode is equal to $0.61\lambda_0$, where $\lambda_0$ is the wavelength in free space of the longest wave in the transmission band. In practice $a$ is made greater than $a_c$ and may vary in different systems, from about $1.5\lambda_0$ to $15\lambda_0$, for example. For illustrative purposes, a suitable inner radius for the wave-guide structures described herein can be about $2a_c$ or $1.21\lambda_0$. Thus, if a hollow-pipe guide five inches in diameter were selected for transmission of $TE_{01}$ waves, $\lambda_0$ in accordance with the above would be two inches.

Figure 3:
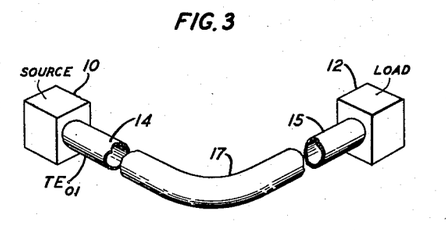
Fig. 3 diagrammatically illustrates a microwave oscillator supplying energy in the form of $TE_{01}$ waves to a load through a circular wave-guide passage including a smoothly curved bend.

In Fig. 3, there is shown a simple wave-guide installation wherein a variable frequency source 10 of any suitable well-known type supplies microwave energy in the form of $TE_{01}$ waves to a load 12, such as, for example, a microwave repeater or antenna, through a circular wave-guiding passage having a hollow interior. Throughout the greater part of its length, the passage comprises a pair of angularly disposed straight uniform sections of wave guide 14, 15, which are joined by a relatively short curved bend 17, the design of which may assume any of the forms described hereinafter.

The characteristic moding or degeneration of $TE_{01}$ into $TM_{11}$ wave power is ascribed to the fact that these waves have substantially the same phase constants, i. e., phase velocity and wavelength and, therefore, interact strongly in a manner analogous to coupled transmission lines as set forth hereinabove. In the following embodiments of the invention, the bends are so treated as to change the phase velocity of the $TM_{11}$ wave relative to the $TE_{01}$ wave to increase the relative difference in propagation constants. This reduces the effective interaction length and coupling discriminant as expressed in Equation 1 and avoids conversion of $TE_{01}$ into $TM_{11}$ wave power.

Figures 4, 4A, 4B, 5:
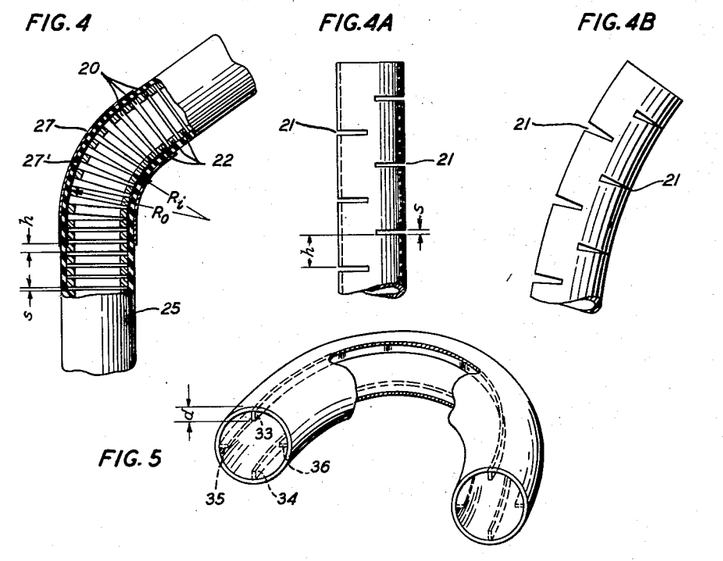
Figs. 4, 4A and 4B are embodiments of the invention utilizing transverse slots in wave-guide bends.
Figs. 5, 5A and 5B are embodiments of the invention utilizing longitudinal ridges in wave-guide bends.

Fig. 4 illlustrates in plan the application of one method of effecting the phase constants of the $TM_{11}$ mode which consists of inserting predominantly reactive effects in the wave-guide bend in such a manner that the phase constants of the TE and TM modes of the same operating frequency will be substantially different. If the wave-guide bend is cut apart by transversal gaps or slots 20 into ring-shaped sections 22, the slots do not appreciably interfere with the transversal current flow of the $TE_{01}$ wave and, therefore, do not substantially change the configuration, wavelength, or velocity of this mode.

However, the $TM_{11}$ mode has a predominantly longitudinal current flow in the wave-guide walls, and it is seriously affected by the division of the guide into short cylindrical rings. At low frequencies, each slot would be a complete open circuit and suppress all current flow, but at the microwave frequencies, involved in wave-guide propagation, each gap constitutes a large capacitive series reactance which serves to increase the phase velocity of the $TM_{11}$ mode. If the slot width were increased sufficiently to cause the inserted capacitive reactance to exceed the inductive reactance of the remaining metal wall, the $TE_{01}$ mode would not be altered appreciably while spurious transmission modes like the $TM_{11}$ would be suppressed altogether.

In a practical structure, the rings shown in Fig. 4 may be enclosed or embedded in a protective casing 25, which may be a rubber hose, a metal or plastic braid or any other suitable protective covering known to the art. The casing may either be rigid, forming a permanent structure, or pliable, forming a flexible one, as shown in Fig. 4. If the covering is made of a non-conductor or a non-conducting dielectric material, a small fraction of the $TE_{01}$ energy and a large part of the spurious $TM_{11}$ energy may be dissipated laterally by radiation through the ring slots 20 and cause cross-talk between adjacent wave guides. Radiation losses and cross-talk can be prevented by covering the outer and/or inner surfaces of the dielectric casing 25 with thin metal shielding layers 27, 27' which may be plated, sprayed, dusted, or painted on. Due to skin effect, the currents flowing in the walls of a wave guide are confined near its inner surface, and accordingly the thickness of the shielding layers need not be greater than approximately 0.1 mil. In the presence of the shielding layers, the longitudinal current flow of the $TM_{11}$ mode follows an irregularly raised path which alters the wave-guide reactance to the undesired mode and affects its phase velocity.

Some of the stray energy reaching the layers 27, 27' is reflected back into the wave guide further affecting the wave-guide reactance to the undesired transmission modes. These reflection effects vary with frequency and may exhibit sharp cavity resonance effects at some frequencies. A more uniform modification of the wave-guide reactance may be obtained by using a glossy material in the casing 25, such, for example, as a plastic material in which carbon dust has been dispersed. In this case, only the metallic shielding layer 27, located on the outside of the casing, should be used.

A self-supporting and semirigid structure similar in performance to the ring-type structure of Fig. 4 may be obtained by slotting the wave-guide bend only partially around its circumference, as shown in Figs. 4A and 4B. Even the partial slots 21 interfere sufficiently with the $TM_{11}$ mode to increase its phase velocity considerably and thus reduce the mode coupling and the resulting transfer of energy to the TM mode.

The guide may be slotted before being bent to form as illustrated in Fig. 4A. In Figs. 4 and 4B, only the curved section of the guide need be slotted. It may not be necessary to employ any form of impedance matching transition into the unslotted straight section of the guide. Fig. 4 is suited for sharp bends or elbows which may be further defined arbitrarily as a bend whose inner radius of curvature $R_i$ is less than about three-fourths of the outer radius of curvature $R_o$. In Fig. 4, the distance $h$ between slots should preferably be of the order of magnitude of $$\frac{\lambda_0}{4}$$

The slot width $s$ may be between $$\frac{\lambda_0}{16}$$

and $$\frac{\lambda_0}{8}$$

wide. Where $\lambda_0$, the wavelength in free space of the longest wave in the transmission band, is two inches, for specific example, the distance $h$ would be about 0.5 inch and $s$, 0.2 inch. In very gradual bends (where the inner radius of curvature is at least three-fourths of the outer radius of curvature), such as those for which Fig. 4B is intended, it is permissible and economical to make the interval $h$ greater than $$\frac{\lambda_0}{4}$$

it may be sufficient to make the slots at intervals corresponding to about one degree of bending, regardless of their separation.

In order to prevent contamination, radiation loss, and cross-talk, the structure of Fig. 4B may be supplied with the same type of coverings used in Fig. 4.

Structures of the type illustrated by Figs. 4, 4A and 4B are disclosed and claimed in applicant's copending application Serial No. 250,752, filed October 10, 1951 as a division of the present application.

Figure 5A:
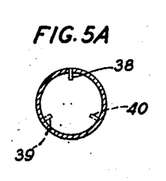
Figure 5B:
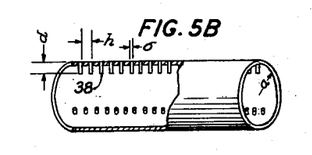

In Figs. 4, 4A, and 4B, a modification of undesired waves, principally of the $TM_{11}$ transmission mode, is accomplished by the removal of metal from the wall of the wave-guide bend, thus changing the phase constants of the bend for TE and TM waves of the same operating frequency. In Figs. 5, 5A, and 5B, modification of undesired $TM_{11}$ mode is accomplished in a complementary manner by the addition of metal in the form of longitudinal ridges, pins, baffles, or the like inside the wave-guide bend along a path which is an equipotential surface of the $TE_{01}$ mode but which has an electric potential difference in the undistorted TM$_{11}$ mode, i. e., along the vertical axis when the wave is oriented as shown in Fig. 2.

One or more solid longitudinal ridges are placed on the inside of the wave-guide bend of Fig. 5, shown with its center of curvature normal to the plane of the paper. Since these ridges are at right angles to the electric field component of the TE$_{01}$ wave, they do not affect the configuration and wavelength of this mode appreciably. However, the configuration and wavelength of the TM$_{11}$ mode and other disturbing modes are greatly altered since the added metal short-circuits a part of the TM electric field pattern. The metallic connection serves to lower the phase velocity of the undesired mode and may be regarded as an inductive shunt susceptance. By extending the short-circuiting ridge completely across the diameter of the guide at right angles to the plane of the bend, the TM$_{11}$ mode is entirely suppressed and no mode coupling problem will exist in the bend. This modification will be discussed in detail in connection with the embodiments of Figs. 6 and 6A to 6F.

If the bending occurs in a single plane, a single ridge 33 or if symmetry is desired, two diametrically opposite ridges 33, 34 located in the "neutral zone" of the bend will decrease the coupling between the modes sufficiently to avoid characteristic moding difficulties. The neutral zone may be defined as that portion of the bend which is neither compressed nor expanded by the bending of the guide, and it will lie, therefore, in a plane normal to the plane of the bend. If the plane of the bend is not known in advance or if the wave guide is to be adapted for bending in an arbitrary plane, at least two ridges placed internally around the curved guide at an angle different from 180 degrees may be required. Two ridges 33, 35 placed at right angles to each other as illustrated in Fig. 5 can be used effectively in such case. Ridges 34, 36 are optional and may be used to increase mechanical strength, avoid warping or preserve symmetry. If one of the ridges should lie in the plane of the bend, the rigidity of the guide will be considerably increased. In those cases where this condition is undesirable, an equispaced arrangement of ridges may be used, as illustrated in Fig. 5A.

In Fig. 5B, which is a side elevation of a bend whose center of curvature lies normal to the plane of the paper, a multiplicity of conducting pins or short radial wires internally attached to the wall of the wave-guide bend are utilized to produce the effect of solid ridges without some of the disadvantages of the latter. The pins can be readily inserted in the bend without increasing its rigidity appreciably and also interrupt any longitudinal current flow induced in the solid ridges with a consequent reduction in losses. An equispaced arrangement of pin-type rigdes 38, 39, 40, as shown in Fig. 5A, which is an end view of the bend of Fig. 5B, may be used where increased rigidity due to bending of the guide in an arbitrary plane may be encountered. When the plane of the bend is known in advance, a single pin-type ridge 38 may suffice.

In Figs. 5, 5A, and 5B, a suitable depth $d$ for the solid or pin-type ridges may be $a/3$, where $a$ is the inside radius of the hollow-pipe guide. The spacing $h$ between adjacent pins in Figs. 5A and 5B should preferably be less than $$\frac{\lambda_0}{4}$$

while a suitable pin diameter $\delta$ might be 0.02$\lambda_0$. with $\lambda_0$ equal to two inches, for specific example, and a guide radius $a$ of 2.5 inches, the depth $d$ in accordance with the above may be 0.8 inch, $h$ may be 0.5 inch and $\delta$, 0.050 inch.

The design principle would not be changed if the above-described longitudinal ridges, pins, or other short-circuiting devices were located inside the wave guide without metallic contact with the wave guide inner wall. In such a case, the short-circuiting device or devices might preferably be supported by dielectric washers or by radial wires which would be located along equipotential lines of the TE$_{01}$ waves.

Figures 6, 6A, 6C:
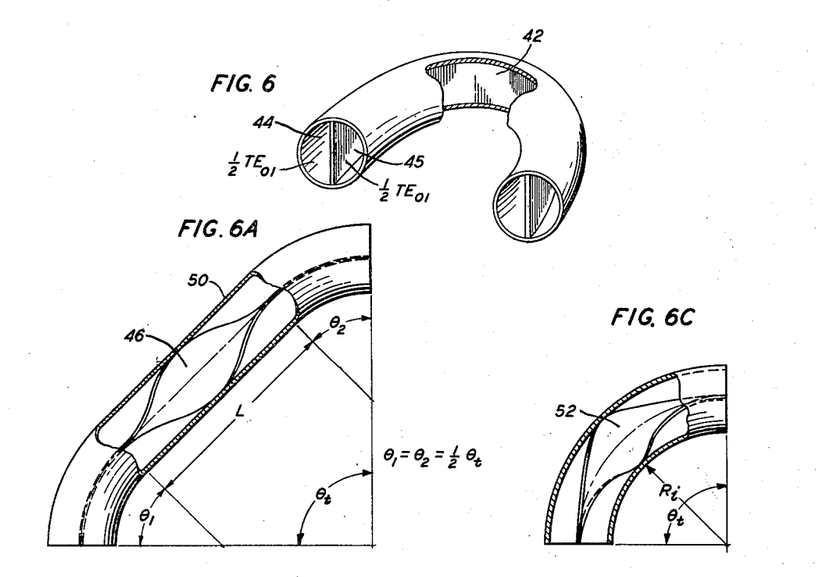
Figs. 6 and 6A to 6F show structures in accordance with the invention utilizing short-circuiting partition septa in wave-guide bends.
Figure 6B:
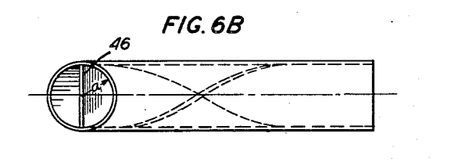

Fig. 6 illustrates a perspective side elevation of a preliminary form of one embodiment of the invention wherein the longitudinal short-circuiting ridge heretofore described is extended completely across a vertical diameter of the guide forming a partition septum 42 in the neutral zone of the bend. In this case, the septum short-circuits and entirely suppresses the TM$_{11}$ mode and, therefore, might be regarded as in itself sufficient to prevent energy transfer between the previously coupled modes. However, the wave guide is divided into two entirely separate semicircular sections 44, 45 with the result that the TE$_{01}$ mode in its traverse of the divided bend splits into two half-TE$_{01}$ waves supported in each section. Due to the unequal lengths of the outer and inner halves of the divided bend and also to the fact that the half-TE$_{01}$ wave flowing in the outer half 44 of the bend exhibits a slightly different phase velocity than the half-TE$_{01}$ wave in the inner half 45, the phases of these two half waves destructively interfere with each other upon recombination at the end of the bend. To avoid such deleterious effects, the partition septum 42 of Fig. 6A is twisted 180 degrees, preferably in a uniform manner, to cause the half-TE$_{01}$ waves to interchange positions. This twisting equalizes the average phase velocities and the path lengths traversed by the half-TE$_{01}$ waves and eliminates the destructive interference that would otherwise occur. In the plan view of Fig. 6A, the total bending angle $\theta_t$ is divided into two equal angles $\theta_1$ and $\theta_2$ with a straight intermediate section of guide 50 interposed therebetween to facilitate insertion of the twisted partition septum 46. The septum 46 starts in the neutral plane of the bend, remains in this plane through the first half bend $\theta_1$, then twists 180 degrees at a uniform rate in the straight portion 50 and continues in the neutral plane through the second half bend $\theta_2$. Fig. 6B is a side elevation of Fig. 6A.

Figure 6D:
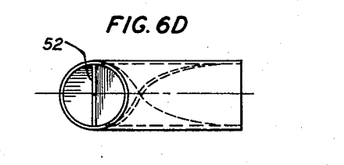

Fig. 6C is a plan view of a modification of Fig. 6A wherein the straight intermediate section of guide 51 is omitted and a continuous twist 52 employed throughout the bend. Fig. 6D is a side elevation of Fig. 6C.

Figure 6E:
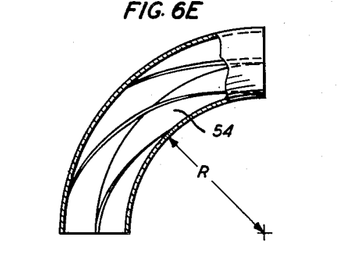
Figure 6F:
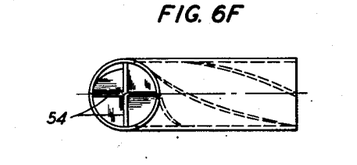

Fig. 6E illustrates also in plan a form of twisted multiple septum 54 that may be effectively utilized for mode suppression and phase equalization in curved wave-guide structures where the range of operating frequencies is such that the wave guide is capable of transmitting more than one mode. In Fig. 6E, the wave guide is divided into four sectors. However, any other number of divisions is possible. Fig. 6F is a side elevation of Fig. 6E.

In the above embodiments, the twisted partition septa can assume a length $L$ at least as large as 8$a$, for example. Where the twist is carried out in a continuous 90-degree bend, such as shown in Figs. 6C and 6E, the minimum bend radius $R_1$ to accommodate a twist of $8a$ length can be shown to be $$\frac{16a}{\pi}$$

or roughly $5a$.

In the foregoing embodiments of the invention, energy losses due to interfering mode combinations of the TE and TM mode are eliminated by modifying the curved wave-guide structure so as to increase the relative difference in propagation constants in order to reduce the coupling discriminant and the effective interaction length of the bends as expressed in Equation 1. In the following embodiments of the invention, it is sought to convert energy transferred from the TE to the TM mode back to the desired $TE_{01}$ mode by reversing the polarity of the coupling coefficient $k$ part way through the bend and thus cancel the effective interaction length of the bend.

As pointed out in the transmission line analogy in the introduction herein, the $TE_{01}$ and $TM_{11}$ modes are closely coupled in a curved wave guide, and these modes can be propagated through a bend only in combination with each other. Analysis shows that two such mode combinations exist in a bend in a uniform circular wave guide. The combination modes are expressed by the equation $$TE_{01} = \frac{1}{2}(TE_{01} + TM_{11}) + \frac{1}{2}(TE_{01} - TM_{11}) \quad (2)$$

The quantity $(TE_{01} + TM_{11})$ symbolically describes a superposition of equal energies of the $TE_{01}$ and $TM_{11}$ modes in such a way that their voltages tend to reenforce each other in an arbitrary reference azimuthal region, as, for example, in the outer half of the bend, and to weaken each other in the opposite region, viz., the inner half of the bend. The quantity $(TE_{01} - TM_{11})$ symbolizes a reversal of the polarity of the $TM_{11}$ component so that reenforcement and weakening occur in opposite regions.

The combination modes represented by the above-bracketed quantities have different phase velocities with the $(TE_{01} + TM_{11})$ combination traveling more slowly than the other. This may be expressed in the form $$W_z = \frac{1}{2}(TE_{01} + TM_{11}) \cos(\omega t - \beta_1 z) + \frac{1}{2}(TE_{01} - TM_{11}) \cos(\omega t - \beta_2 z)$$
$$(3)$$

where $W_z$ is the total energy content of the wave,
$z$ the distance longitudinally along the axis,
$\beta_1$ and $\beta_2$ the different phase constants of the combination modes,
$\omega$ the circular frequency, and
$t$ the time.

Equation 3 can be transformed into $$W_z = TE_{01} \cos\left(\omega t - \frac{\beta_2 + \beta_1}{2} z\right) \cos \frac{\beta_2 - \beta_1}{2} z + TM_{11} \sin\left(\omega t - \frac{\beta_2 + \beta_1}{2} z\right) \sin \frac{\beta_2 - \beta_1}{2} z$$
$$(4)$$

In Equation 3, the bracketed terms containing $\omega t$ indicate the microwave frequency phase, while the terms containing $$\frac{\beta_2 - \beta_1}{2} z$$

only, express the amplitudes of the $TE_{01}$ and $TM_{11}$ waves as functions of $z$. At the beginning of the bend, $z=0$; the coefficient of $TE_{01}$ is unity and that of $TM_{11}$ is zero. If the bend continues until $$z = \frac{\pi}{\beta_2 - \beta_1}$$

the coefficient of $TE_{01}$ becomes zero and that of $TM_{11}$ unity, indicating that the entire energy has been transferred to the $TM_{11}$ mode. It is this seen that the observable energy transfer from $TE_{01}$ to $TM_{11}$ and vice versa is due to the fact that the $TE_{01} + TM_{11}$ combination mode which reenforces wave energies in the outer half of the bend travels more slowly than the $TE_{01} - TM_{11}$ combination mode which reenforces energies in the inner half.

If a given mode combination is constrained to reverse or rotate its position so that energy is reenforced in equal lengths of path in the outer and inner halves of the bend, then, on the average, the phase difference between the phase constants $\beta_2 - \beta_1 = 0$ and a pure $TE_{01}$ wave will emerge at the end of the bend in accordance with Equation 4. The paths of the two combination modes may then be said to have substantially the same phase length. It is only necessary to reverse or rotate the $TM_{11}$ component to cause the mode combinations to interchange their positions, since in each mode combination, the $TE_{01}$ component has circular symmetry.

Upon rotation or reversal of the $TM_{11}$ component, the $(TE_{01} + TM_{11})$ combination mode in the first part of the bend is transformed into a $(TE_{01} - TM_{11})$ combination mode in the second part of the bend with the original $(TE_{01} - TM_{11})$ combination mode undergoing a similar transformation in the second part of the bend. The energy transferred in the first part of the bend to the $(TE_{01} - TM_{11})$ combination mode from the $(TE_{01} + TM_{11})$ combination mode is transferred back into the $TE_{01} + TM_{11}$ transformed combination in the second part of the bend, as represented symbollically below.

This is equivalent to changing the polarity of the coupling $k$ of Equation 1 in the second part of the bend and results in canceling the coupling discriminant $\kappa$ and the effective interaction length of the bend so that little or none of the $TE_{01}$ energy will be lost to the $TM_{11}$ mode in its traverse of the bend.

Figure 7:
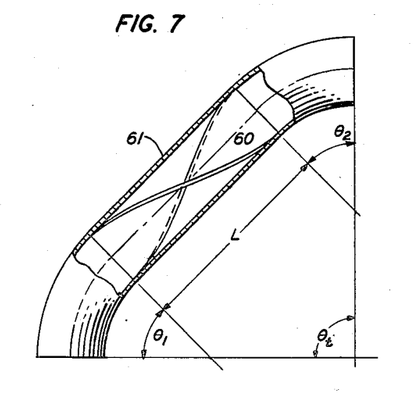
Figs. 7, 7A, 7B and 7C show structures in accordance with the invention utilizing phase-compensating twisted partition septa in wave-guide bends.
Figure 7A:
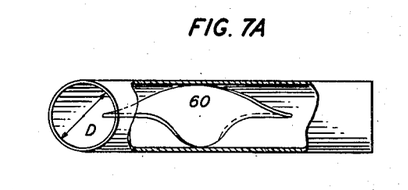

Fig. 7 illustrates in plan one expedient for achieving these results comprising a transposition member in the form of a uniformly twisted partition septum 60 inserted in the bend. The total bending angle $\theta_t$ is divided into two equal angles $\theta_1$, $\theta_2$ with a straight intermediate section of guide 61 interposed therebetween. The beginning of the partition septum 60 coincides with the bending plane so that it does not short-circuit the $TM_{11}$ components but crosses all electrical lines at right angles. It does not interfere with either the TE or TM components of the mode combinations, being located in equipotential planes of both modes. By uniformly twisting the partition septum 60, part of the $TM_{11}$ component follows the direction of the twist, another part is reflected or transformed into other modes. If the twist is very gradual, corresponding, for example, to a ratio of approximately 10 to 1 between the length L of the twist and the wave-guide diameter D, only a very small portion of the $TM_{11}$ component will be reflected or transformed and most of its energy will follow the twist by rotating its plane of polarization. If the partition is twisted 180 degrees, the mode combination which reenforced energy in the outer half of the first part, $\theta_1$, of the bend and traveled more slowly therein is constrained in the second part, $\theta_2$, to reenforce energy in the inner half of the bend and to travel faster therein. Hence, both mode combinations traverse the entire bend in the same total time and emerge in phase, producing a pure $TE_{01}$ wave in accordance with Equations 2 and 4. Fig. 7A is an end elevation of Fig. 7.

Figure 7B:
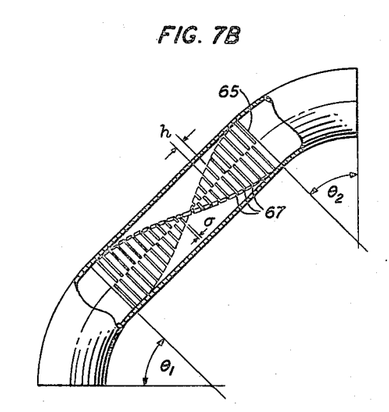
Figure 7C:
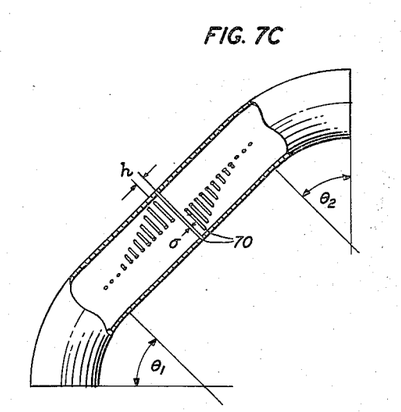

Fig. 7B illustrates a form of slotted partition septum 65 which is simpler to insert in the wave-guide bend than the solid septum of Fig. 7. The septum is made more flexble by the spaced radial slots 67 which have the additional advantage that they reduce longitudinal currents and resulting losses. In Fig. 7C the effect of a twisted partition septum is obtained by means of a multiplicity of radial wires, the ends of which terminate on two diametrically opposed spiral center lines about the periphery of the waveguide bend. Although the various embodiments represented by Figs. 7 to 7C show the twisted partition septa in straight portions of guide interposed between two half bends, these structures would be equally effective if they were placed in continuous bends as shown in Fig. 6C.

The spacing h of the slots of Fig. 7B and the radial wires of Fig. 7C should preferably be less than $$\frac{\lambda_0}{4}$$

The width s of the slots may be less than $$\frac{\lambda_0}{4}$$

and the diameter of the wires around $0.02\lambda_0$.

Figure 8:
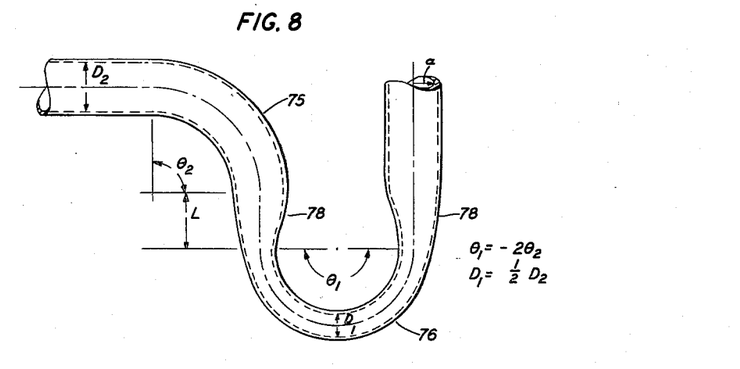
Figs. 8, 8A and 8B are embodiments of the invention utilizing phase-compensating opposing bend structures having different bending angles and radii.
Figure 8A:
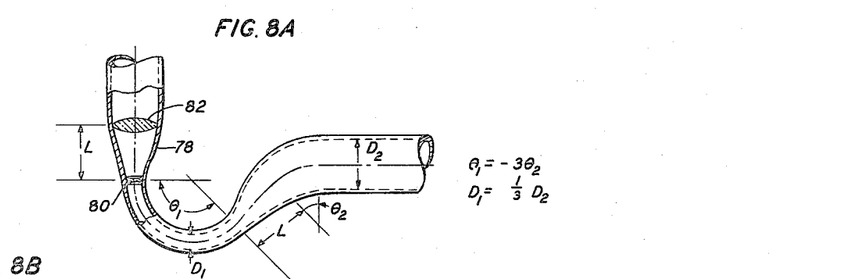
Figure 8B:
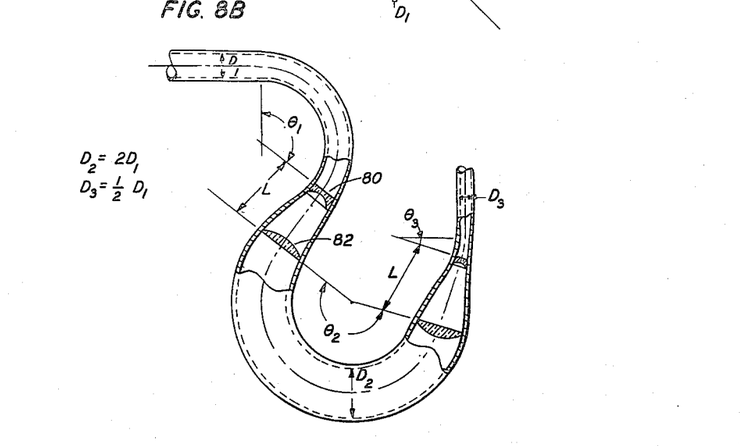

Figs. 8, 8A, and 8B illustrate a different type of wave-guide construction in which the effective interaction length of the bend and coupling discriminant as expressed by Equation 1 is substantially reduced or canceled by reversing the polarity of the coupling coefficient k in a manner different from that employed in connection with Figs. 6A to 6F. As stated hereinabove, the combination ($TE_{01}+TM_{11}$) and ($TE_{01}-TM_{11}$) modes have different phase velocities. The phase difference between these combination modes has been verified by experiment and shown to be approximately $$\varphi = (\beta_2 - \beta_1) = \frac{2.32}{\lambda_0}\theta a \qquad (5)$$

where $\theta$ is the total bending angle, $\lambda_0$ the free space wavelength of the transmitted wave and $a$ the inside radius of the circular guide. The phase difference is thus seen to be proportional to the bending angle $\theta$ and to the wave-guide radius $a$.

Fig. 8 illustrates an embodiment of the invention based on Equation 5 wherein compensation for the phase difference $\varphi$ between the combination modes produced by the bending of a wave guide through an angle $\theta$ is obtained by adding to the original bend 75 an opposing bend 76 of twice the bending angle but of half the diameter. This double but opposite bending angle produces a phase difference of $-\varphi$ in the wave guide of half diameter so that the composite modes are in phase at the end of the double bend producing a pure $TE_{01}$ wave with a net bending angle of $-\theta$.

The above effect may be expressed more generally by the following simple relationships which may be employed for design purposes where it is desired to avoid phase interference incurred in the bending of a guide by combining two wave-guide sections of different radii and bending angles. The phase difference produced by the first bend is $$\varphi_1 = \frac{2.32}{\lambda_0}\theta_1 a_1 \qquad (6)$$

In the second bend $$\varphi_2 = \frac{2.32}{\lambda_0}\theta_2 a_2 \qquad (7)$$

Choosing $a_2 = na_1$, where n may be any number (8)

$\theta_1 + \theta_2 = \theta$ total, and (9)

$\varphi_1 + \varphi_2 = 0$ (10)

then $$\varphi_1 + \varphi_2 = 0 = \frac{2.32}{\lambda_0}a_1(\theta_1 + n\theta_2) \qquad (11)$$

and $$\theta_1 = \frac{n}{n-1}\cdot\theta \text{ total} = \frac{a_2}{a_2-a_1}\theta_t \qquad (12)$$

$$\theta_2 = -\frac{1}{n-1}\cdot\theta \text{ total} = -\frac{a_1}{a_2-a_1}\theta_t \qquad (13)$$

By way of example, where it is desired to bend a wave guide over a total bending angle $\theta_t = 90$ degrees, the design of a broad-band, low-loss structure composed of two opposing bends would be as follows. With the longest free space wavelength of the transmission band $\lambda_0 = 2$ inches, the waveguide radius must exceed the cut-off radius $a_c = 0.61\lambda_0$. Choosing $a_1 = 2$ inches for the first bend and $a_2 = 4$ inches for the second bend, the ratio n of the radii $a_2$ to $a_1$ is 2 and from Equations 12 and 13 above, $\theta_1 = 180$ degrees and $\theta_2 = -90$ degrees. Hence, the structure is composed of one 180-degree bend in a wave guide with an inside radius of 2 inches followed or preceded by an opposing 90-degree bend in a wave guide with an inside radius of 4 inches.

In order to avoid undesired reflections produced by an abrupt change from one wave-guide radius to another, the two opposing bends of Fig. 8 are connected by straight guide sections 78, 78 approximately conical in shape and which form a transition between the bends 75, 76. The length L of the conical sections 78, 78 should preferably be at least five times the difference between the radii of the two bends. Accordingly, in the above-presented example, the length of the conical transposition section would be at least 10 inches.

Fig. 8A is a modification of Fig. 8 and illustrates a phase compensating opposing bend structure wherein the ratio n of the wave-guide radii and bending angles is 3 to 1. Fig. 8A illustrates further the use of dielectric dispersing and collecting lenses 80 and 82, respectively, in the narrow and wide ends, of the transition section 78, 78 between the wave-guide bends to reduce impedance mismatches and insure a smoother electrical system. The dispersing lens 80 must have a virtual focal length $$f_1 = \left(\frac{a_1}{a_2 - a_1}\right) L$$

to transform a parallel cylindrical beam of energy into a divergent or expanding cone. The collecting lens 82 must have a focal length $$f_2 = \left(\frac{a_2}{a_1 - a_2}\right) L$$

to transform the divergent or conical beam back into a parallel beam.

The phase difference between the two mode combinations is only approximately proportional to the wave-guide radius $a$ as expressed by Equation 5 above. The exact expression appears to contain correction terms proportional to higher powers of the wave-guide radius. Accordingly, the double bend structures of Figs. 8A and 8B will cancel the phase losses only over a limited frequency range although a substantial reduction of losses will still be obtained over a relatively wide frequency range. A further widening of the low-loss transmission range can be obtained by a combination of three or more bends of different bending angles and wave-guide radii. Fig. 8B illustrates a triple bend elbow with a net bending angle of 90 degrees. For reasons of simplicity the elbow is shown terminated with a different wave-guide diameter than that shown at its beginning, although it is possible to revert back to the original diameter by means of a gradual adapter. The diameters and bending angles shown were computed for a particular magnitude of higher power corrective terms and are meant to be but illustrative only.

It is to be understood that the above-described embodiments are illustrative of the application of the principles of the invention. Numerous changes may be devised by those skilled in the art without departing from the spirit and scope of the invention.

What is claimed is:

1. A smoothly curved high frequency, electromagnetic wave, hollow pipe, wave-guide bend for $TE_{01}$ waves, said bend including a longitudinal ridge across the interior of the guide, said longitudinal ridge extending completely across the interior of said guide, the ends of said ridge being at right angles to the plane of the bend, said ridge twisting uniformly 180 degrees substantially throughout the entire length of the bend.

2. A high frequency, electromagnetic wave, hollow pipe phase-compensating wave-guide elbow for cylindrical wave guides propagating waves of the $TE_{01}$ transmission mode over a predetermined frequency range, said elbow having an internal partition septum that twists uniformly 180 degrees substantially throughout the length of said elbow.

3. The combination in accordance with claim 2 wherein the ends of said twisted partition septum lie in the bending plane of said elbow.

4. A high frequency, electromagnetic wave, hollow pipe elbow for cylindrical wave guides propagating waves of the $TE_{01}$ transmission mode comprising in combination two smoothly curved sections of wave guide having equal bending angles and a straight intermediate section of guide joining said curved wave guide sections, said straight section of guide including a uniformly twisted partition septum the ends of which lie in the bending plane of said curved wave-guide sections.

5. A first high frequency, electromagnetic wave, hollow pipe, circularly cylindrical, section of wave guide including at least one curved portion and adapted to interconnect second and third like sections of straight wave guide having substantially different longitudinal directions, all three of said sections lying in a common plane, said first section being symmetrical about its center point and including an internal partitioning septum twisting uniformly through an angle of 180 degrees throughout a substantial portion of the length of said first section, said internal septum being also symmetrically disposed with respect to the center point of said first section of wave guide.

6. The arrangement defined in claim 5, the ends of said septum lying in said common plane.

7. The arrangement defined in claim 5, the ends of said septum being normal to said common plane.

8. The arrangement of claim 5, said first section comprising both curved and straight portions.

9. The arrangement of claim 5, said first section comprising a single smoothly curved portion.

10. The arrangement of claim 5, said septum comprising an array of radially positioned rod-like members.

11. The arrangement of claim 5, and at least one additional septum substantially identical to the septum of claim 5, assembled within said first section with its ends lying in common right cross-sectional planes with the ends of said first-mentioned septum, respectively, but at a substantial angle in said cross-sectional planes to the ends of said first-mentioned septum.

12. The arrangement of claim 5, in which said first section is a single smoothly curved portion and the ends of the septum are normal to said common plane.

13. The arrangement of claim 5, in which said first section comprises two smoothly curved portions connected by a straight intermediate portion the septum being positioned in said straight portion and having its ends in said common plane.

WALTER J. ALBERSHEIM.

References Cited in the file of this patent

UNITED STATES PATENTS

| Number | Name | Date |
|---|---|---|
| 2,512,849 | Cork | June 27, 1950 |
| 2,544,923 | Gutton | Mar. 13, 1951 |

(U. S. corresponding to French Patent 888,530)

FOREIGN PATENTS

| Number | Country | Date |
|---|---|---|
| 876,335 | France | Nov. 3, 1942 |